US009957055B2

(12) United States Patent
Marrinan et al.

(10) Patent No.: US 9,957,055 B2
(45) Date of Patent: May 1, 2018

(54) AFT ENGINE FOR AN AIRCRAFT

(71) Applicant: General Electric Company, Schenectady, NY (US)

(72) Inventors: Patrick Michael Marrinan, Mason, OH (US); Thomas Lee Becker, Symmes Township, OH (US); Kurt David Murrow, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 14/859,523

(22) Filed: Sep. 21, 2015

(65) Prior Publication Data

US 2017/0081034 A1    Mar. 23, 2017

(51) Int. Cl.
| | | |
|---|---|---|
| *B64D 29/04* | (2006.01) | |
| *B64D 27/10* | (2006.01) | |
| *B64C 21/06* | (2006.01) | |
| *F02K 3/06* | (2006.01) | |
| *B64C 1/16* | (2006.01) | |
| *B64D 27/20* | (2006.01) | |
| *B64D 33/02* | (2006.01) | |

(52) U.S. Cl.
CPC ............... *B64D 27/10* (2013.01); *B64C 1/16* (2013.01); *B64C 21/06* (2013.01); *B64D 27/20* (2013.01); *B64D 29/04* (2013.01); *B64D 33/02* (2013.01); *F02K 3/06* (2013.01); *B64C 2230/04* (2013.01); *Y02T 50/166* (2013.01); *Y02T 50/44* (2013.01)

(58) Field of Classification Search
CPC ........ B64D 27/10; B64D 29/00; B64D 27/24; B64D 27/16; B64D 27/00; B64D 27/02; B64D 27/06; B64D 27/14; B64F 5/00
See application file for complete search history.

(56) References Cited

U.S. PATENT DOCUMENTS

| | | |
|---|---|---|
| 2,477,637 A | 8/1949 | Mercier |
| 2,812,912 A | 11/1957 | Stevens et al. |
| 2,918,229 A | 12/1959 | Lippisch |

(Continued)

FOREIGN PATENT DOCUMENTS

| | | |
|---|---|---|
| EP | 0887259 A2 | 12/1998 |
| EP | 1616786 A1 | 1/2006 |

(Continued)

OTHER PUBLICATIONS

Wikipedia Page for the Boeing 737.*

(Continued)

*Primary Examiner* — Brian M O'Hara
(74) *Attorney, Agent, or Firm* — GE Aviation Patent Operation; Pamela A. Kachur

(57) ABSTRACT

A propulsion system for an aircraft including a plurality of primary engines is provided. The plurality of primary engines includes at least a first primary engine and a second primary engine, each configured for mounting to a respective one of a pair of wings of the aircraft. The propulsion system additionally includes an aft engine configured for mounting at a tail section of the aircraft. The plurality of primary engines are sized to provide an amount of thrust sufficient for the aircraft to takeoff without use of the aft engine, such that the aft engine may be configured as a non-prime reliable engine.

20 Claims, 4 Drawing Sheets

(56) References Cited

U.S. PATENT DOCUMENTS

| | | |
|---|---|---|
| 3,194,516 A | 7/1965 | Willy |
| 3,286,470 A | 11/1966 | Gerlaugh |
| 3,289,975 A * | 12/1966 | Hall ............ B64C 29/0066 244/12.5 |
| 3,312,448 A | 4/1967 | Hull, Jr. et al. |
| 3,844,110 A | 10/1974 | Widlansky et al. |
| 4,089,493 A | 5/1978 | Paulson |
| 4,371,133 A | 2/1983 | Edgley |
| 4,605,185 A | 8/1986 | Reyes |
| 4,722,357 A | 2/1988 | Wynosky |
| 4,913,380 A | 4/1990 | Vardaman et al. |
| 5,721,402 A | 2/1998 | Parente |
| 5,927,644 A | 7/1999 | Ellis et al. |
| 6,045,325 A * | 4/2000 | Horvath ............ F01D 5/148 277/637 |
| 6,089,505 A | 7/2000 | Gruensfelder et al. |
| 6,976,655 B2 | 12/2005 | Thompson |
| 7,387,189 B2 | 6/2008 | James et al. |
| 7,493,754 B2 | 2/2009 | Moniz et al. |
| 7,665,689 B2 | 2/2010 | McComb |
| 7,806,363 B2 | 10/2010 | Udall et al. |
| 7,819,358 B2 | 10/2010 | Belleville |
| 7,905,449 B2 | 3/2011 | Cazals et al. |
| 7,976,273 B2 | 7/2011 | Suciu et al. |
| 8,033,094 B2 | 10/2011 | Suciu et al. |
| 8,099,944 B2 | 1/2012 | Foster et al. |
| 8,109,073 B2 | 2/2012 | Foster et al. |
| 8,162,254 B2 | 4/2012 | Roche |
| 8,181,900 B2 | 5/2012 | Chene et al. |
| 8,220,739 B2 | 7/2012 | Cazals |
| 8,226,040 B2 | 7/2012 | Neto |
| 8,291,716 B2 | 10/2012 | Foster et al. |
| 8,317,126 B2 | 11/2012 | Harris et al. |
| 8,469,306 B2 | 6/2013 | Kuhn, Jr. |
| 8,544,793 B1 | 10/2013 | Shammoh |
| 8,549,833 B2 | 10/2013 | Hyde et al. |
| 8,596,036 B2 | 12/2013 | Hyde et al. |
| 8,640,439 B2 | 2/2014 | Hoffjann et al. |
| 8,651,414 B2 * | 2/2014 | Cazals ............ B64C 1/068 244/13 |
| 8,672,263 B2 | 3/2014 | Stolte |
| 8,684,304 B2 | 4/2014 | Burns et al. |
| 8,857,191 B2 | 10/2014 | Hyde et al. |
| 8,890,343 B2 | 11/2014 | Bulin et al. |
| 8,939,399 B2 | 1/2015 | Kouros et al. |
| 8,998,580 B2 | 4/2015 | Quiroz-Hernandez |
| 9,038,398 B2 | 5/2015 | Suciu et al. |
| 9,637,217 B2 | 5/2017 | Marrinan et al. |
| 2006/0011779 A1 | 1/2006 | Cazals et al. |
| 2008/0023590 A1 | 1/2008 | Merrill et al. |
| 2009/0127384 A1 | 5/2009 | Voorhees |
| 2010/0038473 A1 | 2/2010 | Schneider et al. |
| 2010/0294882 A1 | 11/2010 | Gantie et al. |
| 2011/0215204 A1 | 9/2011 | Evulet |
| 2012/0006935 A1 | 1/2012 | Bhargava |
| 2012/0076635 A1 | 3/2012 | Atassi |
| 2012/0119020 A1 | 5/2012 | Burns et al. |
| 2012/0153076 A1 | 6/2012 | Burns et al. |
| 2012/0209456 A1 | 8/2012 | Harmon et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0099065 A1 | 4/2013 | Stuhlberger |
| 2013/0139515 A1 | 6/2013 | Schlak |
| 2013/0184958 A1 | 7/2013 | Dyrla et al. |
| 2013/0199624 A1 | 8/2013 | Smith et al. |
| 2013/0227950 A1 | 9/2013 | Anderson et al. |
| 2013/0251525 A1 | 9/2013 | Saiz |
| 2013/0284279 A1 | 10/2013 | Richards |
| 2013/0336781 A1 | 12/2013 | Rolt et al. |
| 2014/0010652 A1 | 1/2014 | Suntharalingam et al. |
| 2014/0060995 A1 | 3/2014 | Anderson et al. |
| 2014/0151495 A1 | 6/2014 | Kuhn, Jr. |
| 2014/0179535 A1 | 6/2014 | Stuckl et al. |
| 2014/0212279 A1 | 7/2014 | Boudebiza et al. |
| 2014/0250861 A1 | 9/2014 | Eames |
| 2014/0283519 A1 | 9/2014 | Mariotto et al. |
| 2014/0290208 A1 | 10/2014 | Rechain et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0307510 A1 | 12/2014 | Viala et al. |
| 2014/0367525 A1 | 12/2014 | Salyer |
| 2014/0369810 A1 | 12/2014 | Binks et al. |
| 2015/0013306 A1 | 1/2015 | Shelley |
| 2015/0028594 A1 | 1/2015 | Mariotto |
| 2015/0226156 A1 * | 8/2015 | Tillman ............ F02K 1/52 415/208.1 |
| 2015/0285144 A1 | 10/2015 | Todorovic et al. |
| 2017/0081035 A1 | 3/2017 | Becker et al. |
| 2017/0081036 A1 | 3/2017 | Marrinan et al. |
| 2017/0081037 A1 | 3/2017 | Marrinan et al. |
| 2017/0101191 A1 | 4/2017 | Becker et al. |

FOREIGN PATENT DOCUMENTS

| | | |
|---|---|---|
| EP | 2730501 A2 | 5/2014 |
| EP | 3048042 A1 | 7/2016 |
| EP | 3093235 A1 | 11/2016 |
| FR | 1181456 A | 6/1959 |
| FR | 2993859 A1 | 1/2014 |
| GB | 406713 A | 2/1934 |
| GB | 2489311 A | 9/2012 |
| WO | WO 2010/020199 A1 | 2/2010 |
| WO | WO 2014/072615 A1 | 5/2014 |

OTHER PUBLICATIONS

Bauhaus Luftahrt: Concept Study "Propulsive Fuselage" Adding an Extra Engine to Reduce Emissions. Provided in both English and German.* http://aviationweek.com/awin/boeing-researches-alternative-propulsion-and-fuel-options, Aviation Week & Space Technology, Jun. 4, 2012.

Bradley et al., "Subsonic Ultra Green Aircraft Research, Phase II: N+4 Advanced Concept Development," NASA/CR-2012-217556, May 2012.

European Search Report and Opinion issued in connection with corresponding EP Application No.16188826.8 dated Feb. 15, 2017.

U.S. Notice of Allowance issued in connection with related U.S. Appl. No. 14/859,566 dated Jul. 14, 2017.

European Search Report and Opinion issued in connection with Related EP Application No. 16188786.4 dated Nov. 16, 2016.

Notice of Allowance issued in connection with Related U.S. Appl. No. 14/859,549 dated Jan. 5, 2017.

U.S. Non-Final Office Action issued in connection with Related U.S. Appl. No. 14/859,566 dated Feb. 1, 2017.

U.S. Non-Final Office Action issued in connection with Related U.S. Appl. No. 14/859,556 dated Feb. 9, 2017.

European Search Report and Opinion issued in connection with Related EP Application No. 16192467.5 dated Feb. 15, 2017.

European Search Report and Opinion issued in connection with Related EP Application No. 16188464.8 dated Feb. 17, 2017.

European Search Report and Opinion issued in connection with Related EP Application No. 16188994.4 dated Feb. 17, 2017.

European Search Report and Opinion issued in connection with Related EP Application No. 16189736.8 dated Feb. 17, 2017.

U.S. Non-Final Office Action issued in connection with Related U.S. Appl. No. 14/859,514 dated Apr. 6, 2017.

Final Office Action issued in connection with Related U.S. Appl. No. 14/859,566 dated May 11, 2017.

* cited by examiner

AFT ENGINE FOR AN AIRCRAFT

FIELD OF THE INVENTION

The present subject matter relates generally to an aircraft propulsion system including an aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

An additional aircraft engine can be integrated into, e.g., a vertical stabilizer of the aircraft to provide additional thrust for the aircraft. Each of the aircraft engines provided, including the underwing mounted aircraft engines and vertical stabilizer-integrated aircraft engine, are all sized to provide substantially identical amounts of thrust when operating at maximum capacity. Moreover, each of the aircraft engines are sized such that when operated, the cumulative amount of thrust is sufficient for the aircraft to takeoff normally.

Thus, with such a configuration, it is necessary that each of the aircraft engines be capable of operating properly in order to complete a flight mission. For example, with such a configuration, the aircraft is not able to takeoff normally without the underwing mounted aircraft engines and the vertical stabilizer-integrated aircraft engine all operating properly. Thus, the vertical stabilizer-integrated aircraft engine, while increasing a total thrust of the aircraft, may also increase the likelihood that the aircraft will be grounded due to mechanical problems.

Therefore, a propulsion system for an aircraft having an engine separate from the underwing mounted aircraft engines capable of contributing to a net thrust for the aircraft without increasing an opportunity for the aircraft be grounded due to mechanical problems would be useful. Specifically, a propulsion system for an aircraft having an engine separate from the underwing mounted aircraft engines capable of contributing to a net thrust for the aircraft (or other benefits) that is not required to operate for the aircraft to takeoff normally would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a propulsion system for an aircraft having a pair of wings and a tail section is provided. The propulsion system includes a plurality of primary engines, the plurality of primary engines including at least a first primary engine and a second primary engine. The first primary engine is configured for mounting to a first of the pair of wings of the aircraft, and the second primary engine is configured for mounting to a second of the pair of wings of the aircraft. The propulsion system additionally includes an aft engine configured for mounting at the tail section of the aircraft. The plurality of primary engines are sized to provide an amount of thrust sufficient for the aircraft to takeoff without use of the aft engine.

In another exemplary embodiment of the present disclosure, an aircraft is provided. The aircraft includes a fuselage extending between a nose end and a tail section, a pair of wings extending outward from opposing sides of the fuselage at a location between the nose end and the tail section, and a plurality of primary engines. At least a first of the plurality of primary engines is mounted to a first of the pair of wings and at least a second of the plurality of primary engines is mounted to a second of the pair of wings. Each of the plurality of primary engines is sized to generate a maximum primary engine thrust when operated at maximum capacity. The aircraft additionally includes an aft engine mounted at the tail section of the aircraft. The aft engine is sized to generate a maximum aft engine thrust when operated at maximum capacity, the maximum aft engine thrust being at least ten percent greater than or less than the maximum primary engine thrust.

In an exemplary aspect of the present disclosure a method for operating an aircraft is provided. The aircraft includes a pair of wings, an aft engine mounted at a tail section of the aircraft, and a plurality of primary aircraft engines. At least a first of the plurality of primary engines is mounted to a first of the pair of wings and at least a second of the plurality of primary engines is mounted to a second of the pair of wings. The method includes operating the plurality of primary aircraft engines to generate an amount of thrust sufficient for the aircraft to takeoff, and operating the aft engine at less than full capacity during a takeoff operating mode of the aircraft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
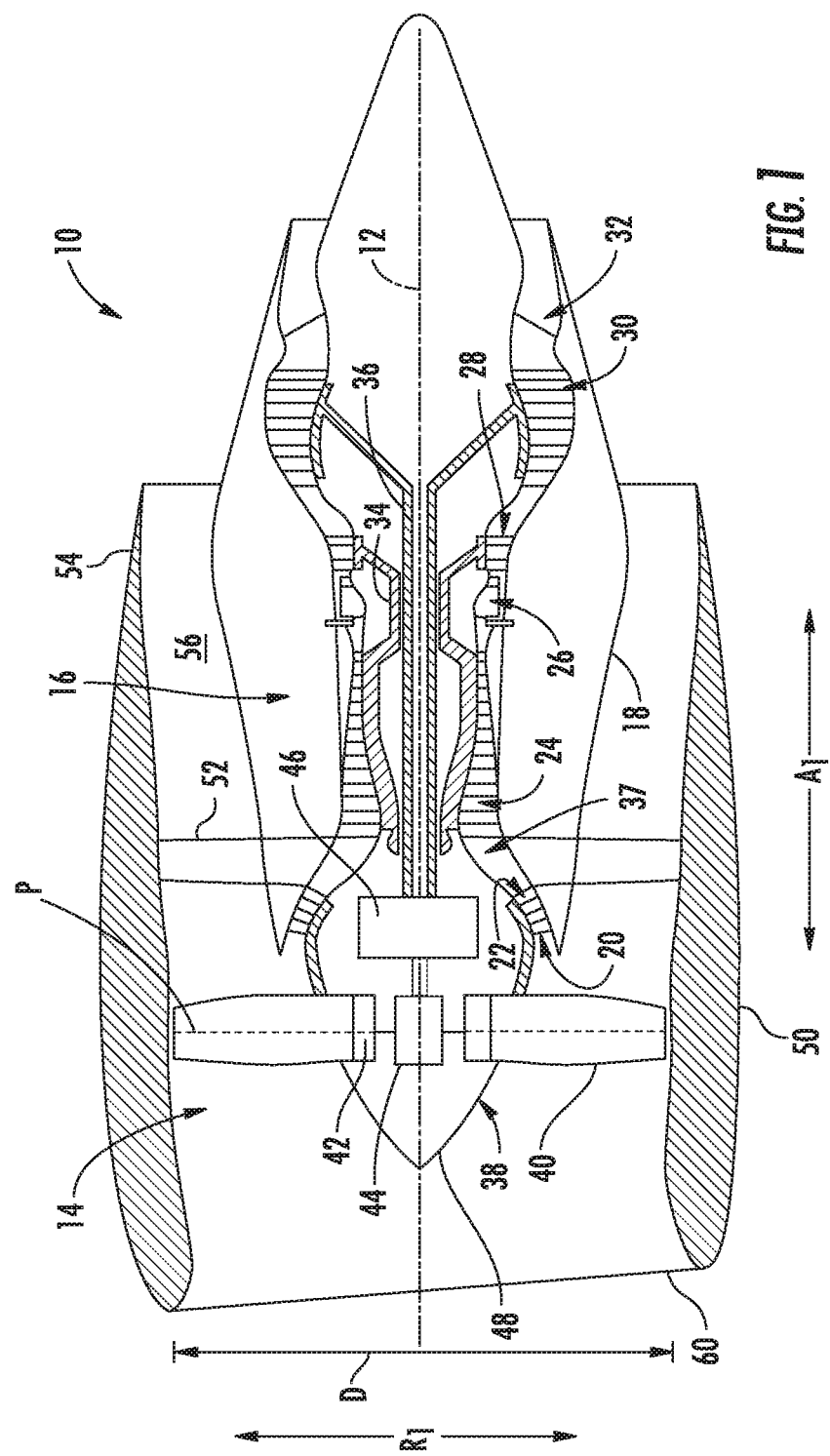
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure provides for a propulsion system for an aircraft having a plurality of primary aircraft engines and an aft engine that may contribute to a net thrust for the aircraft. The plurality of primary aircraft engines may be, for example, underwing mounted turbofan jet engines sized to provide a sufficient amount of thrust for the aircraft to takeoff normally. By contrast, the aft engine may be mounted at a tail section of the aircraft and may be utilized, e.g., during an end of the aircraft's climb and/or during the aircraft's cruise. Notably, during these high altitude conditions, a relatively high corrected flow through the plurality of primary aircraft engines is typical, and thus a respective fan for each of the plurality of primary aircraft engines is typically sized to accommodate the relatively high corrected flow. However, utilization of the aft fan during these high altitude flight conditions can allow for a reduced amount of corrected flow through the plurality of primary aircraft engines, and thus for a reduced size of the fans for each of the plurality of primary aircraft engines. The resulting reduction in thrust provided from the reduced corrected flow through the plurality of primary aircraft engines can be supplemented by the aft engine to achieve a desired net thrust for the aircraft. Notably, such a reduction in fan size of the plurality of primary aircraft engines can reduce an overall weight of the plurality of primary aircraft engines, which may contribute to an increase in efficiency of the propulsion system as a whole.

Reference will now be made to the drawings, wherein identical numerals indicate the same elements throughout the figures. Specifically, FIG. 1 provides a schematic, cross-sectional view of an exemplary primary aircraft engine. Specifically, for the embodiment depicted, the primary aircraft engine is configured as a high bypass turbofan jet engine, referred to herein as "turbofan engine 10." As shown in FIG. 1, the turbofan engine 10 defines an axial direction $A_1$ (extending parallel to a longitudinal centerline 12 provided for reference) and a radial direction $R_1$. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction $R_1$ and define a fan diameter D. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

It should be appreciated, however, that the exemplary turbofan engine 10 depicted in FIG. 1 is by way of example only, and that in other exemplary embodiments, the turbofan engine 10 may have any other suitable configuration including, e.g., any suitable number of shafts or spools, compressors, and/or turbines.

Figure 2:
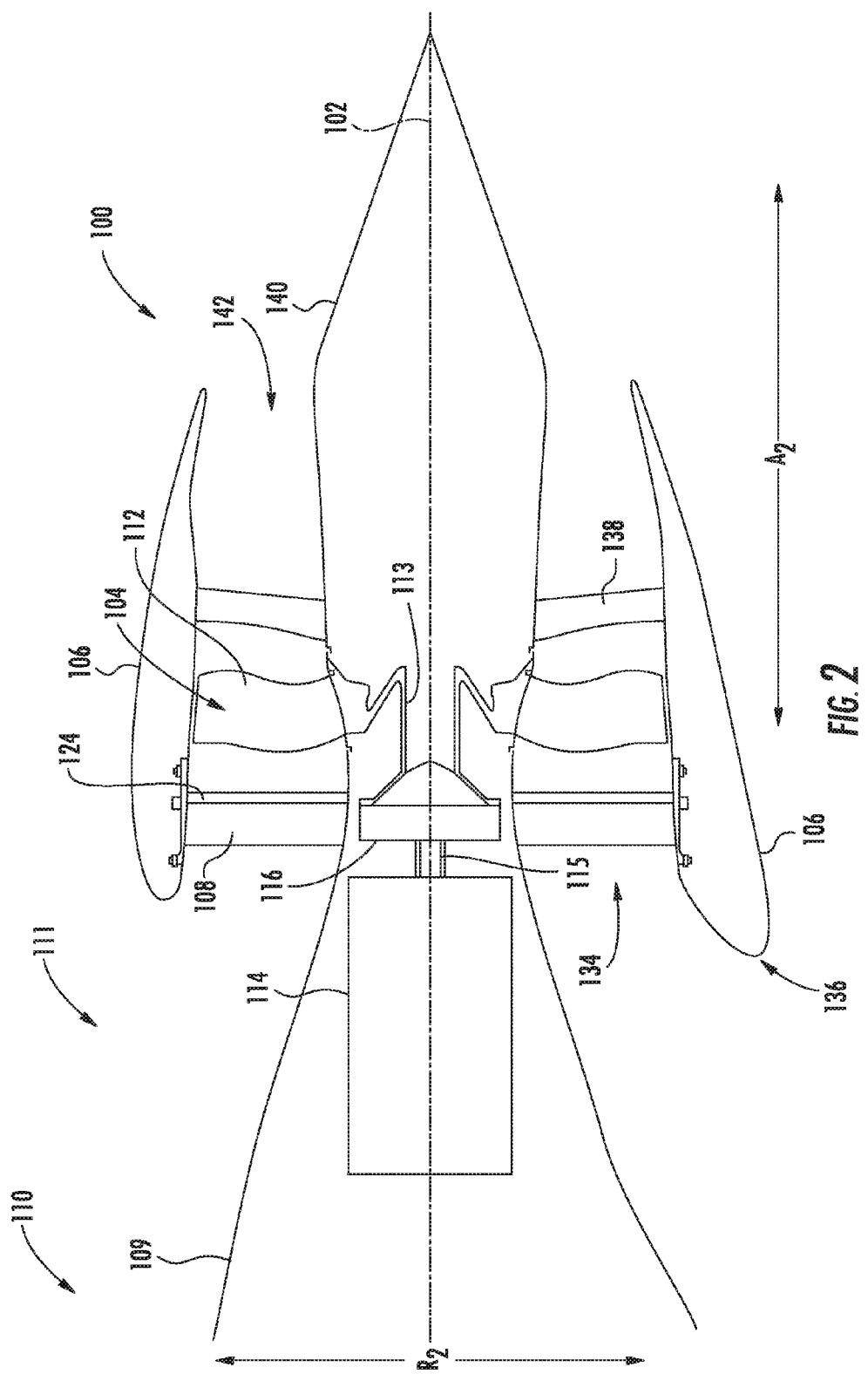
FIG. 2 is a schematic, cross-sectional view of an aft engine in accordance with an exemplary embodiment of the present disclosure.

Reference will now be made to FIG. 2. FIG. 2 provides a schematic, cross-sectional side view of an aft engine in accordance with various embodiments of the present disclosure. The aft engine depicted is mounted to an aircraft 110 at a tail section 111 of the aircraft 110. Specifically, for the embodiment depicted, the aft engine is configured as a boundary layer ingestion (BLI) fan 100. As shown in FIG. 2, the BLI fan 100 defines an axial direction $A_2$ extending along a longitudinal centerline axis 102 that extends therethrough for reference, and a radial direction $R_2$.

In general, the BLI fan 100 includes a fan 104 rotatable about the centerline axis 102, a nacelle 106 extending around a portion of the fan 104, and one or more structural members 108 extending between the nacelle 106 and a fuselage 109 of the aircraft 110 to which the BLI fan 100 is mounted. The fan 104 includes a plurality of fan blades 112 spaced generally along a circumferential direction. Additionally, one or more structural members 108 extend between the nacelle 106 and the fuselage 109 of the aircraft 110 at a location forward of the plurality of fan blades 112. Further, the nacelle 106 extends around and encircles the plurality of fan blades 112, as well as at least a portion of the fuselage 109 of the aircraft 110 (at a tail section 111) and a mean line of the aircraft 110 when, as in FIG. 2, the BLI fan 100 is mounted to the aircraft 110. Particularly for the embodiment depicted, the nacelle 106 extends substantially three hundred and sixty degrees around the fuselage 109 and mean line.

As is also depicted in FIG. 2, the fan 104 additionally includes a fan shaft 113 with the plurality of fan blades 112 attached thereto. Although not depicted, the fan shaft 113 may be rotatably supported by one or more bearings located forward of the plurality of fan blades 112 and, optionally, one or more bearings located aft of the plurality of fan blades 112. Such bearings may be any suitable combination of roller bearings, ball bearings, thrust bearings, etc.

In certain exemplary embodiments, the plurality of fan blades 112 may be attached in a fixed manner to the fan shaft 113, or alternatively, the plurality of fan blades 112 may be rotatably attached to the fan shaft 113. For example, the plurality of fan blades 112 may be attached to the fan shaft 113 such that a pitch of each of the plurality of fan blades 112 may be changed, e.g., in unison, by a pitch change mechanism (not shown). Changing the pitch of the plurality of fan blades 112 may increase an efficiency of the BLI fan 100 and/or may allow the BLI fan 100 to achieve a desired thrust profile. With such an exemplary embodiment, the BLI fan 100 may be referred to as a variable pitch BLI fan.

The fan shaft 113 is mechanically coupled to a power source 114 located at least partially within the fuselage 109 of the aircraft 110. For the embodiment depicted, the fan shaft 113 is mechanically coupled to the power source 114 through a gearbox 116. The gearbox 116 may be configured to modify a rotational speed of the power source 114, or rather of a shaft 115 of the power source 114, such that the fan 104 of the BLI fan 100 rotates at a desired rotational speed. The gearbox 116 may be a fixed ratio gearbox, or alternatively, the gearbox 116 may define a variable gear ratio.

The power source 114 may be any suitable power source. For example, in certain exemplary embodiments, the power source may be an electric power source (e.g., the BLI fan 100 may be configured as part of a gas-electric propulsion system, such as the gas-electric propulsion system 250 described below with reference to FIGS. 3 and 4). However, in other exemplary embodiments, the power source 114 may alternatively be configured as a gas engine, such as a gas turbine engine. Moreover, in certain exemplary embodiments, the power source 114 may be positioned at any other suitable location within, e.g., the fuselage 109 of the aircraft 110 or the BLI fan 100. For example, in certain exemplary embodiments, the power source 114 may be configured as a gas turbine engine positioned at least partially within the BLI fan 100.

As briefly stated above, the BLI fan 100 includes one or more structural members 108 for mounting the BLI fan 100 to the aircraft 110. The one or more structural members 108 for the embodiment depicted extend substantially along the radial direction $R_2$ of the BLI fan 100 between the nacelle 106 and the fuselage 109 of the aircraft 110 for mounting the BLI fan 100 to the fuselage 109 of the aircraft 110. It should be appreciated, that as used herein, terms of approximation, such as "approximately," "substantially," or "about," refer to being within a ten percent margin of error.

Additionally, for the embodiment depicted, the one or more structural members 108 are configured as inlet guide vanes for the fan 104. Specifically, the one or more structural members 108 are shaped and oriented to direct and condition a flow of air into the BLI fan 100 to increase an efficiency of the BLI fan 100. In certain exemplary embodiments, the one or more structural members 108 may be configured as fixed inlet guide vanes extending between the nacelle 106 and the fuselage 109 of the aircraft 110. However, for the embodiment depicted, the one or more structural members 108 are configured as variable inlet guide vanes. Specifically, the one or more structural members 108 each include a flap 124 at an aft end configured to rotate about a radial axis between a variety of positions to vary a direction of the air flowing thereover.

Referring still to FIG. 2, the BLI fan 100 defines an inlet 134 at a forward end 136 between the nacelle 106 and the fuselage 109 of the aircraft 110. As mentioned above, the nacelle 106 of the BLI fan 100 extends around the fuselage 109 of the aircraft 110 at an aft end of the aircraft 110. Accordingly, for the embodiment depicted, the inlet 134 of the BLI fan 100 extends substantially three hundred sixty degrees (360°) around the fuselage 109 of the aircraft 110 when, such as in the embodiment depicted, the BLI fan 100 is mounted to the aircraft 110. Notably, in certain embodiments, the one or more structural members 108 may be evenly spaced along a circumferential direction of the BLI fan 100. Although, in other exemplary embodiments, the structural members 108 may not be evenly spaced along the circumferential direction.

Moreover, the BLI fan 100 includes one or more outlet guide vanes 138 and a tail cone 140. The one or more outlet guide vanes 138 for the embodiment depicted extend between the nacelle 106 and the tail cone 140 for adding strength and rigidity to the BLI fan 100, as well as for directing a flow of air through the BLI fan 100. The outlet guide vanes 138 may be evenly spaced along the circumferential direction, or may have any other suitable spacing. Additionally, the outlet guide vanes 138 may be fixed outlet guide vanes, or alternatively may be variable outlet guide vanes.

Aft of the plurality of fan blades 112, and for the embodiment depicted, aft of the one or more outlet guide vanes 138, the BLI fan 100 additionally defines a nozzle 142 between the nacelle 106 and the tail cone 140. The nozzle 142 may be configured to generate an amount of trust from the air flowing therethrough, and the tail cone 140 may be shaped to minimize an amount of drag on the BLI fan 100. However, in other embodiments, the tail cone 140 may have any other shape and may, e.g., end forward of an aft end of the nacelle 106 such that the tail cone 140 is enclosed by the nacelle 106 at an aft end. Additionally, in other embodiments, the BLI fan 100 may not be configured to generate any measurable amount of thrust, and instead may be configured to ingest air from a boundary layer of air of the fuselage 109 of the aircraft 110 and add energy/speed up such air to reduce an overall drag on the aircraft 110 (and thus increase a net thrust of the aircraft 110).

It should be appreciated, that the BLI fan 100 depicted in FIG. 2 is provided by way of example only and that in other exemplary embodiments, any other suitable BLI fan or aft engine may be provided. In other exemplary embodiments, for example, the BLI fan 100 may have any other suitable configuration. For example, in other exemplary embodiments, the one or more structural members 108 of the BLI fan 100 may extend axially, as opposed to the radial configuration depicted. Moreover, although the exemplary BLI fan 100 depicted includes a plurality of outlet guide vanes 138 located downstream of the plurality of fan blades 112, in other exemplary embodiments, the BLI fan 100 may not include the plurality of outlet guide vanes 138. With such a configuration, the tail cone 140 may or may not rotate about the longitudinal centerline 102 with, e.g., the fan shaft 113 and plurality of fan blades 112. Furthermore, in certain exemplary embodiments, a vertical stabilizer and/or horizontal stabilizer of the aircraft 110 to which the BLI fan 100 is mounted may extend between the fuselage 109 of the aircraft 110 and the nacelle 106 of the BLI fan 100, potentially forming a portion of the one or more structural members 108. Alternatively, in still other embodiments, a vertical stabilizer and/or horizontal stabilizer of the aircraft 110 to which the BLI fan 100 is mounted may instead be attached to the nacelle 106 of the BLI fan 100.

Figure 3:
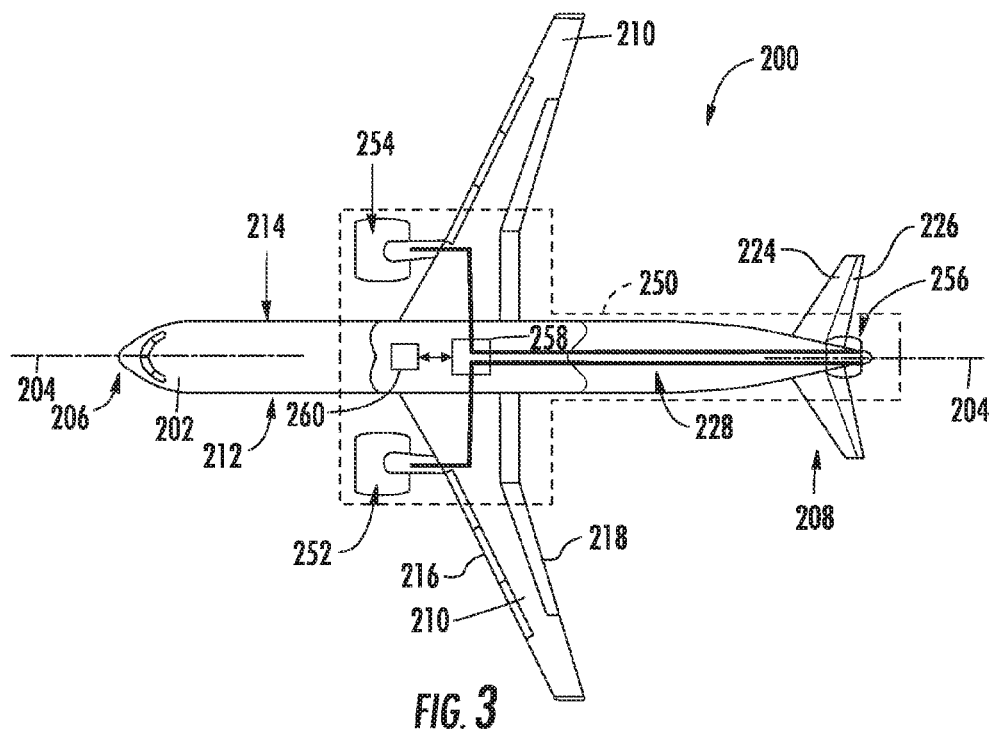
FIG. 3 is a top view of an aircraft according to various exemplary embodiments of the present disclosure.
Figure 4:
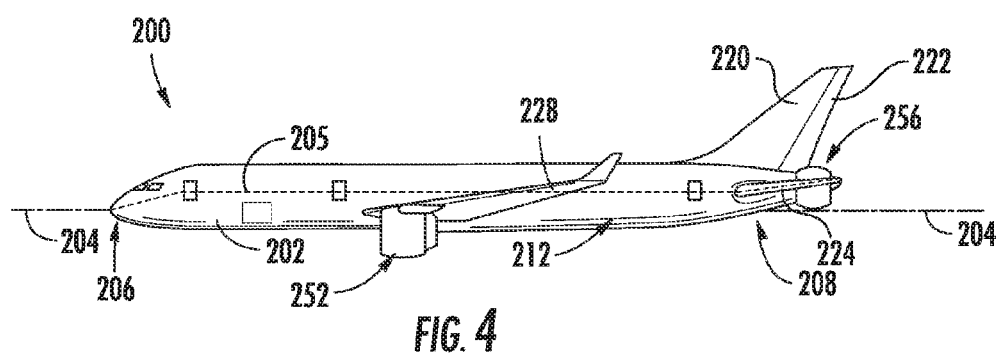
FIG. 4 is a port side view of the exemplary aircraft of FIG. 3.

Reference will now be made to FIGS. 3 and 4. FIG. 3 provides a top view of an exemplary aircraft 200 as may incorporate various embodiments of the present invention, and FIG. 4 provides a port side view of the aircraft 200 as illustrated in FIG. 3.

As shown in FIGS. 3 and 4 collectively, the aircraft 200 includes a fuselage 202 that extends longitudinally between a forward or nose section 206 and an aft or tail section 208 of the aircraft 200. Additionally, the aircraft 200 defines a longitudinal centerline 204 and a mean line 205, the mean line 205 extending between the nose section 206 and the tail section 208. As used herein, the "mean line" refers to a midpoint line extending along a length of the aircraft 200, not taking into account the appendages of the aircraft 200 (such as the wings and stabilizers discussed below).

The aircraft 200 further includes a pair of wings 210. The first of such wings 210 extends laterally outwardly with respect to the longitudinal centerline 204 from a port side 212 of the fuselage 202 and the second of such wings 210 extends laterally outwardly with respect to the longitudinal centerline 204 from a starboard side 214 of the fuselage 202. Each of the wings 210 for the exemplary embodiment depicted includes one or more leading edge flaps 216 and one or more trailing edge flaps 218. The aircraft 200 further includes a vertical stabilizer 220 having a rudder flap 222 for yaw control, and a pair of horizontal stabilizers 224, each having an elevator flap 226 for pitch control. The fuselage 202 additionally includes an outer surface or skin 228.

Moreover, the exemplary aircraft 200 of FIGS. 3 and 4 includes a propulsion system 250, herein referred to as "system 250," in accordance with an exemplary embodiment of the present disclosure. The exemplary system 250 includes a plurality of primary aircraft engines, each configured for mounting to the wings 210. Specifically, the exemplary system depicted includes a first primary aircraft engine 252 and a second primary aircraft engine 254. The first primary aircraft engine 252 is configured for mounting to a first of the pair of wings 210 of the aircraft 200, and the second primary aircraft engine 254 is configured for mounting to the second of the pair of wings 210 of the aircraft 200. Specifically, the first and second primary aircraft engines 252, 254 are each suspended beneath a respective wing 210 in an under-wing configuration. In certain exemplary embodiments, the first and/or second primary aircraft engine 252, 254 may be configured as a turbofan engine, such as the exemplary turbofan engine 10 described above with reference to FIG. 1. Alternatively, however, in other exemplary embodiments, the first and/or second primary aircraft engine 252, 254 instead be configured as any other suitable aircraft engine, such as a turbojet engine, a turboprop engine, turboshaft engine, a turbocore engine, etc. Moreover, in still other exemplary embodiments, the system 250 may include any other suitable number of primary aircraft engines.

Additionally, the exemplary propulsion system 250 includes an aft engine 256 configured for mounting to the aircraft 200 at a location aft of the wings 210 and/or the primary aircraft engines 252, 254, e.g., at the tail section 208 of the aircraft 200. In at least certain exemplary embodiments, the aft engine 256 may be configured as a Boundary Layer Ingestion (BLI) fan, such as the BLI fan 100 described above with reference to FIG. 2. Accordingly, the aft engine 256 may be fixedly connected to the fuselage 202 of the aircraft 200 at the tail section 208 of the aircraft 200. With such a configuration, the aft engine 256 is incorporated into or blended with the tail section 208. However, it should be appreciated that in various other embodiments, the aft engine 256 may alternatively be positioned at any suitable location of the tail section 208 and/or any other suitable aft engine may be provided.

In various embodiments, the primary aircraft engines 252, 254 may be configured to provide power to an electric generator 258 and/or an energy storage device 260. For example, one or both of the jet engines 252, 254 may be configured to provide mechanical power from a rotating shaft (such as an LP shaft or HP shaft) to the electric generator 258. Additionally, the electric generator 258 may be configured to convert the mechanical power to electrical power and provide such electrical power to one or both of the energy storage device 260 or the aft engine 256. Accordingly, in such an embodiment, the propulsion system 250 may be referred to as a gas-electric propulsion system. It should be appreciated, however, that the aircraft 200 and propulsion system 250 depicted in FIGS. 3 and 4 is provided by way of example only and that in other exemplary embodiments of the present disclosure, any other suitable aircraft 200 may be provided having a propulsion system 250 configured in any other suitable manner.

Referring still to FIGS. 3 and 4, the exemplary propulsion system 250 is configured such that the primary aircraft engines 252, 254 provide the aircraft 200 with an amount of thrust sufficient for the aircraft 200 to takeoff normally without use of the aft engine 256.

For example, the first primary aircraft engine 252 and second primary aircraft engine 254 may each be sized to generate an amount of thrust when operated at maximum capacity (a "maximum primary engine thrust $T_{PE}$"). The aft engine 256, by contrast, may be a different capacity engine, such that it generates a different amount of thrust than the primary aircraft engines. For example, the aft engine 256 may be sized to generate a maximum aft engine thrust when operated at maximum capacity (a "maximum aft engine thrust $T_{AE}$"), the maximum aft engine thrust $T_{AE}$ being different than the maximum primary engine thrust $T_{PE}$. For example, in certain exemplary embodiments the maximum aft engine thrust $T_{AE}$ may be at least ten percent greater than or less than the maximum primary engine thrust $T_{PE}$. Particularly, however, for the embodiment depicted, the aft engine 256 is configured as a lower capacity engine, such that it generates less thrust than the primary aircraft engines. For example, the aft engine 256 may be sized to generate a maximum aft engine thrust $T_{AE}$ that is less than the maximum primary engine thrust $T_{PE}$. For example, the maximum aft engine thrust $T_{AE}$ may be up to about eighty-five percent of the maximum primary engine thrust $T_{PE}$ (i.e., the aft engine 256 may be sized to generate an amount of thrust less than or equal to about eighty-five percent of the maximum primary engine thrust $T_{PE}$ when the aft engine 256 is operated at maximum capacity).

It should be appreciated that as used herein, "operated at maximum capacity" refers to operating a respective engine substantially at full throttle to generate the maximum amount of thrust the engine is safely capable of producing under normal operating conditions. Further, when a maximum amount of thrust of one engine is compared to a maximum amount of thrust of a different engine (or engines), these maximum amounts refer to the maximum amounts at the same or similar conditions (i.e., corrected for differences in altitude, temperature, Mach number, etc.).

Additionally, in certain exemplary embodiments, the plurality of primary aircraft engines (which for the embodiment depicted includes the first primary aircraft engine 252 and the second primary aircraft engine 254), may together be configured to generate a cumulative maximum amount of thrust when each of the primary aircraft engines are operated at full capacity (a "maximum primary engines thrust $T_{PE,TOTAL}$"). The maximum primary engines thrust $T_{PE,TOTAL}$ may be an amount of thrust sufficient for the aircraft 200 to takeoff under normal conditions. For example, the maximum primary engines thrust $T_{PE,TOTAL}$ may be sufficient for the aircraft 200 to takeoff at a conventional speed from a conventionally sized airstrip or runway for a given size and weight of the aircraft 200. With such an embodiment, the aft engine 256 may be sized to generate a fraction of the maximum primary engines thrust $T_{PE,TOTAL}$. For example, in certain embodiments, the maximum aft engine thrust $T_{AE}$ may be less than about thirty-five percent of the maximum primary engines thrust $T_{PE,TOTAL}$.

It should be appreciated, however, that in other exemplary embodiments, the aft engine 256 may have any other suitable size relative to the plurality of primary engines. For example, in other exemplary embodiments, the maximum aft engine thrust $T_{AE}$ may be up to about eighty percent of the maximum primary thrust $T_{PE}$, up to about seventy-five percent of the maximum primary thrust $T_{PE}$, or up to about seventy percent of the maximum primary thrust $T_{PE}$. Similarly, in other embodiments, the maximum aft engine thrust $T_{AE}$ may instead be less than about thirty percent of the cumulative maximum primary engines thrust $T_{PE,TOTAL}$, less than about twenty percent of the cumulative maximum primary engines thrust $T_{PE,TOTAL}$, less than about fifteen percent of the cumulative maximum primary engines thrust $T_{PE,TOTAL}$, or less than about ten percent of the cumulative maximum primary engines thrust $T_{PE,TOTAL}$.

With the above configurations, the aft engine 256 may be considered a non-prime reliable engine. As used herein, "non-prime reliable" refers to an engine not being needed for normal takeoff or for reaching a final destination. Accordingly, with a non-prime reliable engine, an aircraft 200 may reach its final destination in the event of a failure of such engine.

A propulsion system including an aft engine in accordance with one or more embodiments of the present disclosure may allow for a more efficient overall propulsion system. For example, inclusion of an aft engine in accordance with one or more embodiments of the present disclosure may allow for a fan diameter of the plurality of primary aircraft engines to be reduced, such that a weight of the primary aircraft engines is also reduced. (Notably, although inclusion of an aft fan may result in an increased net weight of the propulsion system, the overall efficiency gains may outweigh the increased net weight.) The reduction in fan diameter of the plurality of primary aircraft engines may result in a reduced amount of thrust generation during, e.g., a top of climb and/or cruise operations, of the aircraft (due to, e.g., a reduction in an amount of corrected flow through the plurality of primary aircraft engines). However, the aft engine may supplement the thrust generation of the primary aircraft engines during such operating conditions to produce a desired amount of net thrust for the aircraft.

Figure 5:
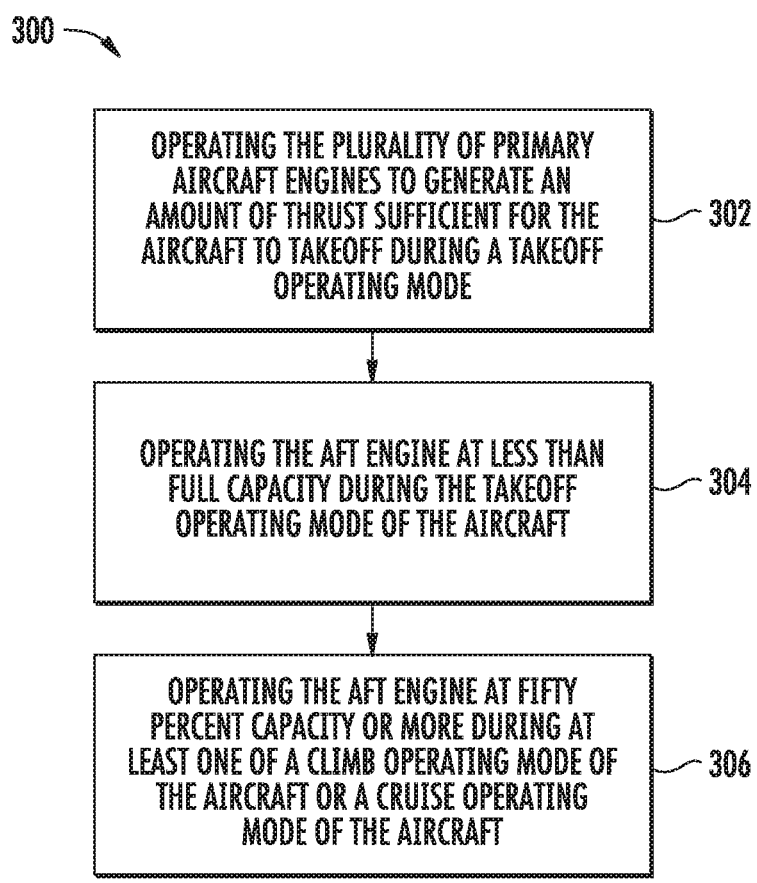
FIG. 5 is a flow diagram of a method for operating an aircraft in accordance with an exemplary aspect of the present disclosure.

Referring now to FIG. 5, a flow diagram is provided of a method (300) for operating an aircraft in accordance with an exemplary aspect of the present disclosure. The exemplary method (300) depicted in FIG. 5 may utilize the aircraft and/or propulsion system described above with reference to FIGS. 3 and 4. Accordingly, in certain exemplary aspects, the method (300) depicted in FIG. 5 may apply to an aircraft having a plurality of wings, a plurality of primary aircraft engines, and an aft engine. Additionally, at least a first of the plurality primary engines may be mounted to a first of the pair of wings and at least a second of the plurality of primary engines may be mounted to a second of the pair of wings. Further, the aft engine may be mounted at a tail section of the aircraft.

As depicted, the method (300) generally includes at (302) operating the plurality of primary aircraft engines to generate an amount of thrust sufficient for the aircraft to takeoff during a takeoff operating mode. Moreover, the exemplary method (300) depicted in FIG. 5 includes at (304) operating the aft engine at less than full capacity during the takeoff operating mode of the aircraft. For example, operating the aft engine at (304) at less than full capacity during the takeoff operating mode may include operating the aft engine at less than about eighty percent of the aft engine's full capacity, less than about sixty-five percent of the aft engine's full capacity, less than about fifty percent of the aft engine's full capacity, less than about thirty-five percent of the aft engine's full capacity, or less than about twenty percent of the aft engine's full capacity. Accordingly, with such an exemplary method, the aircraft may takeoff primarily using thrust generated by the plurality of primary aircraft engines.

After takeoff, however, the exemplary method (300) may operate the aft engine at a higher capacity, such as at a full capacity. For example, the exemplary aspect depicted additionally includes at (306) operating the aft engine at fifty percent capacity or more during at least one of a climb operating mode of the aircraft or a cruise operating mode of the aircraft. Specifically, in at least certain exemplary embodiments, operating the aft engine at (306) may include operating the aft engine at seventy-five percent capacity or more, ninety percent capacity or more, or ninety-five percent capacity or more. Each of the climb operating mode of the aircraft and cruise operating mode of the aircraft may be initiated after takeoff. Notably, operating the aft engine at (306) after takeoff may allow for more efficient operation of the aft engine. Specifically, during the climb and cruise operating modes, there may be more boundary layer air flowing around the fuselage, such that more boundary layer air may be consumed by the aft engine, and an efficiency of the aft engine may be greater.

Furthermore, as briefly touched on above in FIGS. 3 and 4, in at least certain exemplary aspects, the aft engine may be powered at least in part by one or more of the plurality of primary aircraft engines. Accordingly, in certain exemplary aspects, the method (300) for operating the aircraft may include providing energy from the plurality of primary aircraft engines to the aft engine to operate the aft engine after takeoff of the aircraft is complete.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft having a pair of wings and a tail section, the propulsion system comprising:
a plurality of primary engines including at least a first primary engine and a second primary engine, the first primary engine configured for mounting to a first of the pair of wings of the aircraft, and the second primary engine configured for mounting to a second of the pair of wings of the aircraft; and an aft engine configured for mounting at the tail section of the aircraft, the plurality of primary engines sized to provide an amount of thrust sufficient for the aircraft to takeoff without use of the aft engine;

wherein the aft engine comprises a fan shaft mechanically coupled to a power source located at least partially within a fuselage of the aircraft and one or more structural members configured as variable inlet guide vanes extending between a nacelle and the fuselage of the aircraft that include a flap at an aft end configured to rotate about a radial axis between a variety of positions to vary a direction of the air flowing thereover.

2. The propulsion system of claim 1, wherein the first primary engine and the second primary engine are each configured as a turbofan jet engine.

3. The propulsion system of claim 1, wherein the aft engine is a boundary layer ingestion fan.

4. The propulsion system of claim 3, wherein the boundary layer ingestion fan includes a nacelle defining an inlet extending approximately three hundred and sixty degrees around a fuselage of the aircraft at the tail section of the aircraft when the boundary layer ingestion fan is mounted to the aircraft.

5. The propulsion system of claim 1, wherein the first primary engine and the second primary engine are each sized to generate a maximum primary engine thrust when operated at maximum capacity, and wherein the aft engine is sized to generate up to about eighty-five percent of the maximum primary engine thrust when operated at maximum capacity.

6. The propulsion system of claim 1, wherein the first primary engine and the second primary engine are each sized to generate a maximum primary engine thrust when operated at maximum capacity, and wherein the aft engine is sized to generate up to about seventy-five percent of the maximum primary engine thrust when operated at maximum capacity.

7. An aircraft comprising:
a fuselage extending between a nose end and a tail section;
a pair of wings extending outward from opposing sides of the fuselage at a location between the nose end and the tail section;
a plurality of primary engines, at least a first of the plurality of primary engines mounted to a first of the pair of wings and at least a second of the plurality of primary engines mounted to a second of the pair of wings, each of the plurality of primary engines sized to generate a maximum primary engine thrust when operated at maximum capacity; and
an aft engine mounted at the tail section of the aircraft, the aft engine sized to generate a maximum aft engine thrust when operated at maximum capacity, the maximum aft engine thrust being at least ten percent greater than or less than the maximum primary engine thrust;
wherein the aft engine comprises a fan shaft mechanically coupled to a power source located at least partially within a fuselage of the aircraft and one or more structural members configured as variable inlet guide vanes extending between a nacelle and the fuselage of the aircraft that include a flap at an aft end configured to rotate about a radial axis between a variety of positions to vary a direction of the air flowing thereover.

8. The aircraft of claim 7, wherein the plurality of primary engines are sized to generate an amount of thrust sufficient for the aircraft to takeoff without use of the aft engine.

9. The aircraft of claim 7, wherein the plurality of primary engines are sized to 1' thrust when each of the plurality of primary engines are operated at maximum capacity, and wherein the maximum aft engine thrust is less than or equal to about thirty percent of the cumulative maximum primary engines thrust.

10. The aircraft of claim 7, wherein the plurality of primary engines are each configured as turbofan jet engines.

11. The aircraft of claim 7, wherein the aft engine is a boundary layer ingestion fan.

12. The aircraft of claim 11, wherein the boundary layer ingestion fan includes a nacelle defining an inlet extending approximately three hundred and sixty degrees around the fuselage of the aircraft at the tail section the aircraft.

13. The aircraft of claim 11, wherein the boundary layer ingestion fan includes a nacelle and a fan having a plurality of fan blades, and wherein the nacelle extends around and encloses the plurality of fan blades of the fan.

14. The aircraft of claim 7, wherein the maximum aft engine thrust is equal to about eighty-five percent or less of the maximum primary engine thrust.

15. A method for operating an aircraft having a pair of wings, an aft engine mounted at a tail section of the aircraft, and a plurality of primary aircraft engines, at least a first of the plurality of primary engines mounted to a first of the pair of wings and at least a second of the plurality of primary engines mounted to a second of the pair of wings, the method comprising:
operating the plurality of primary aircraft engines to generate an amount of thrust sufficient for the aircraft to takeoff; and
operating the aft engine at less than full capacity during a takeoff operating mode of the aircraft; wherein the aft engine comprises a fan shaft mechanically coupled to a power source located at least partially within a fuselage of the aircraft and one or more structural members configured as variable inlet guide vanes extending between a nacelle and the fuselage of the aircraft that include a flap at an aft end configured to rotate about a radial axis between a variety of positions to vary a direction of the air flowing thereover.

16. The method of claim 15, wherein operating the aft engine less than full capacity during takeoff operating mode includes operating the aft engine at less than about seventy-five percent capacity during the takeoff operating mode.

17. The method of claim 15, further comprising
operating the aft engine at fifty percent capacity or more during at least one of a climb operating mode of the aircraft or a cruise operating mode of the aircraft.

18. The method of claim 15, wherein each of the plurality of primary aircraft engines are sized to provide a maximum primary engine thrust when operated at full capacity, wherein the maximum primary engine thrusts of each of the plurality of primary aircraft engines are substantially the same, wherein the aft engine is sized to provide a maximum aft engine thrust when operated at full capacity, and wherein the maximum aft engine thrust is less than about eighty-five percent of the maximum primary engine thrust.

19. The method of claim 15, wherein the plurality of primary aircraft engines together generate a cumulative maximum primary engines thrust when operated at full capacity, wherein the aft engine defines a maximum aft engine thrust when operated at full capacity, and wherein the maximum aft engine thrust is less than about thirty percent of the cumulative maximum primary engines thrust.

20. The method of claim 15, further comprising
providing energy from one or more of the plurality of primary aircraft engines to the aft engine to operate the aft engine after the takeoff operating mode of the aircraft is complete.

\* \* \* \* \*